United States Patent [19]

Campana

[11] Patent Number: 4,713,542

[45] Date of Patent: Dec. 15, 1987

[54] TON BEAM NEUTRALIZER

[75] Inventor: Joseph E. Campana, Alexandria, Va.

[73] Assignee: United States of America as represented by the Secretary of the Navy

[21] Appl. No.: 666,597

[22] Filed: Oct. 31, 1984

[51] Int. Cl.⁴ .......................... H01S 1/00; H01S 9/00

[52] U.S. Cl. .................................................. 250/251

[58] Field of Search .................... 250/251, 396 R, 399

[56] References Cited

U.S. PATENT DOCUMENTS

| | | | |
|---|---|---|---|
| 3,363,124 | 1/1968 | Bensussan et al. | 250/251 |
| 3,569,706 | 3/1971 | Meckel | 250/84 |
| 3,657,542 | 4/1972 | Futch, Jr. et al. | 250/84 |
| 3,663,852 | 5/1972 | Luce | 313/63 |
| 3,700,899 | 10/1972 | Kaminsky | 250/84 |
| 3,767,925 | 10/1973 | Foley, Jr. et al. | 250/251 |
| 4,081,674 | 3/1978 | Tamura et al. | 250/251 |
| 4,480,185 | 10/1984 | Hashimoto | 250/251 |

OTHER PUBLICATIONS

"A Unique Fast Atom Source for Mass Spectrometry Applications", John F. Mahoney, Don M. Goebel, Julius Pereland A. Theordore Forrester, Biomedical Mask Spectrometry, vol. 10, No. 2, pp. 61–64 (1983).

"FAB: The Fast Atomic Beam Source," J. Franks, International Journal of Mass Spectrometry and Ion Physics, vol. 46, pp. 343–346 (1983).

"Fast-Atom Molecular Secondary-Ion Mass Spectrometry,"Mark M. Ross, Jeffrey R. Wyatt, Richard J. Colton and Joseph E. Compana, Internatinal Journal of Mass Spectrometry and Ion Processes, vol. 54, pp. 237–247 (1983).

*Primary Examiner*—Bruce C. Anderson
*Attorney, Agent, or Firm*—John L. Forrest; Stephen G. Mican; Brian C. Kelly

[57] ABSTRACT

A method and apparatus for converting an ion beam from a standard ion gun into a neutral particle beam by the processes of resonance neutralization followed by Auger deexcitation and/or Auger neutralization, established by directing the ion beam to pass in the proximity of a suitable metal surface.

19 Claims, 5 Drawing Figures

ION BEAM NEUTRALIZER SCHEMATIC

ION BEAM NEUTRALIZER COMPONENTS

ION BEAM NEUTRALIZER ASSEMBLY

SUMMARY OF NEUTRALIZER METAL ION-TO-NEUTRAL CONVERSION

| NEUTRALIZER METAL | WORK FUNCTION (eV) | $I_i/I_V$ | $I_i/I_T$ |
|---|---|---|---|
| Al | 4.08 | 5 | 250 |
| Au | 4.82 | 10 | 380 |
| Mo | 4.20 | 15 | 500 |
| NONE (CHARGE-EXCHANGE) | -- | 21 | 1700 |

$I_i$ IS THE $Ag^{107}$ ION ABUNDANCE MEASURED WITH THE ELECTROSTATIC DEFLECTION GRID GROUNDED, $I_V$ IS WITH THE GRID AT A VOLTAGE EQUAL TO THE ION-SOURCE VOLTAGE, AND $I_T$ IS WITH THE GRID AT A THRESHOLD VOLTAGE, 200 V ABOVE THE ION-SOURCE VOLTAGE.

| RELATIVE SECONDARY ELECTRON YEILDS FROM VARIOUS METALS |
|---|
| Be > Al > Zr > Mn > Co > Pb > Fe > Cu > Au > W > Pt > Mo. |

TABLE 1

ION BEAM NEUTRALIZER SCHEMATIC

MOLECULAR SIMS SPECTRUM WITH ION BEAM NEUTRALIZER POLYSTYRENE 0.5mm THICK FILM CAST ON Ag

TON BEAM NEUTRALIZER

BACKGROUND OF THE INVENTION

The present invention relates to energetic atomic beam generation, and particularly to electrically neutral molecular or atomic beam devices and methods for mass spectrometry and surface analysis, often called fast-atom bombardment mass spectrometry (FABMS).

FABMS has several advantages over secondary-ion mass spectrometry (SIMS). The primary advantage is that FABMS allows the use of a liquid matrix, which simplifies sample preparation and maintains a reservoir of undamaged molecular sample species when subjected to an atomic beam under dynamic (intense particle flux) conditions. Secondly, the use of a neutral atom beam in the FABMS avoids the problem of floating the ion gun system above the accelerating voltage of the spectrometer. Finally, sample charge buildup is reduced with this neutral particle bombardment.

Molecular SIMS is invaluable for the analysis and characterization of bulk solid surfaces, their films and molecular overlayers. The static (low particle flux) used in molecular SIMS is desirable to avoid damage to the molecular solid sample. Although conventional ion sources are capable of operation under such static conditions, attempts to charge neutralize the sample with an electron flood gun to avoid sample charge buildup are often ineffective, and they can result in bombardment-induced radiation damage and electron-stimulated desorption. The dynamic (intense particle) flux of conventional atomic beam sources quickly destroys the molecular overlayers or thin molecular film samples associated with the molecular SIMS method.

OBJECTS OF THE INVENTION

Therefore, one object of the present invention is to generate an energetic neutral particle beam for FABMS under static, low particle flux conditions.

Another object is to generate a neutral particle beam that may be adjusted to operate under dynamic (intense particle flux) conditions for FABMS as well as static (low flux conditions) for molecular SIMS.

Yet another object of the invention is to adapt a standard ion beam device that operates under both dynamic and static conditions to produce a neutral particle beam.

SUMMARY OF THE INVENTION

The present invention neutralizes the output of a standard ion gun by interacting the ions with a metal surface to convert most of them into neutral particles and then deflecting the remaining ions out of the resulting neutral particle beam with an electric field. Because the present invention is usable with an ion gun that is adjustable for both static and dynamic conditions, the neutral particle beam produced by the invention may be used for both dynamic (intense particle flux) FABMS as well as static (low particle flux) molecular SIMS.

In a preferred embodiment, a neutralizing metal plate held at ground potential having a plurality of cavities passing through it is placed over the exit aperature of a standard ion gun. Most of the ions passing through the neutralizing plate are converted to a beam of primarily neutral particles. Most of the ions remaining in the beam of particles emanating from the neutralizer plate are repelled out of the beam by an electrostatically charged wire mesh grid mounted across the path of the particle beam.

The foregoing, as well as other objects, features and advantages of the invention will be apparent from the following descriptions of the preferred embodiment of the invention, and the novel features will be particularly pointed out hereinafter in connection with the appended claims.

DETAILED DESCRIPTION OF THE PREFERRED EMBODIMENT

The present invention converts ions into neutral particles by passing the ions through a specially designed aperture fabricated from a selected metal. Conversion from ions to neutral particles operates primarily by the principle of resonance neutralization $$A^{+}+n(e^{-})\rightarrow A+(n-1)e^{-}, \quad (1)$$

followed by Auger de-excitation $$A+n(e^{-})\rightarrow A+e+(n-1)e^{-}, \quad (2)$$

or Auger neutralization $$A^{+}+n(e^{-})\rightarrow A+(n-2)e^{-}+e^{-}, \quad (3)$$

where A is the species to be neutralized and n is the total electrons in the selected-metal aperture. Additionally, neutralization of ions occurs through resonance or radiative capture of the secondary electrons emitted from the metal aperture by kinetic electron emission, as well as resonance charge-exchange reactions occurring in the ion gun when the gas pressures are high enough such that ion/molecule interactions are possible.

Neutralization due to the potential electron emission process, as well as by the kinetic emission of secondary electrons, involves the recombination of ions with electrons from a metal surface as the ion approaches the surface. The potential emission process is typically independent of the kinetic energy of the incident ion and is governed by the potential energy of excitation. The interatomic potential emission processes, previously stated, generally occur if the condition $W<I$ is fulfilled, where W is the average work function of the metal surface and I is the ionization energy of the incident ion. The electron escape probability and secondary electron yield are directly related to the magnitude of the difference between the ionization energy of the incident particle and the work function of the metal surface. The kinetic emission of secondary electrons occurs above a velocity threshold generally taken as $5.5\times10^{4}$ m/s. The contribution of electron yield from kinetic emission increases with the energy (or velocity) and the angle of incidence of the primary particle. This electron-capture neutralization mechanism takes place when ions capture low-energy electrons emitted by kinetic emission and those free electrons emitted as a result of the potential emission processes. In other words, potential and kinetic electron emission provide a "sea" of low-energy electrons in the vicinity of the metal for ions to capture. The secondary electron yields of various metals from one kinetic emission study using 30 k-eV incident argon ions have been determined in the order Be>Al>Mn>Co>Pb>Cu>Au>W>Pt>Mo.
Be Al Mn Co Pb Cu Au W Pt Mo.

Therefore, these ion and electron recombination mechanisms could be differentiated by choice of the neutralizing metal. When the potential emission criterion, $W<I$, is fulfilled and the incident particle velocity exceeds the kinetic velocity threshold, the secondary electron yield will be the sum of the yields from the two processes, kinetic and potential emission.

Figure 1:
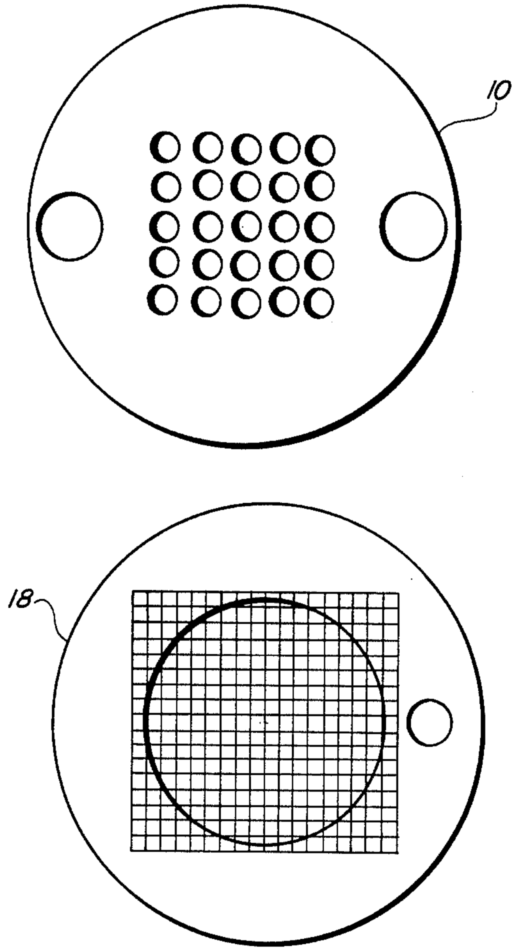
FIG. 1 is an illustration of an ion beam neutralizer element and a repeller grid according to the present invention.
Figure 2:
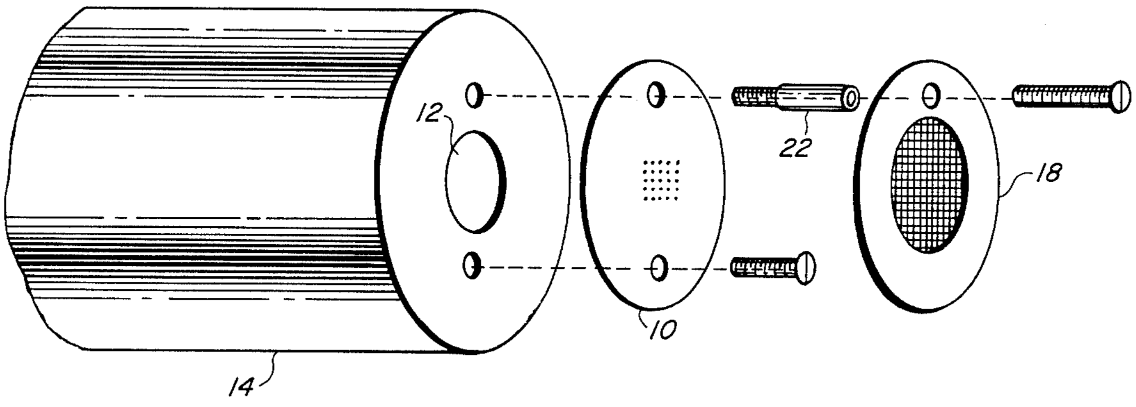
FIG. 2 is an illustration of a complete ion beam neutralizer assembly according to the present invention.

Referring to the drawings, wherein reference characters designate like or corresponding parts throughout the views, the preferred embodiment is illustrated in FIG. 2. The preferred embodiment as applied to a standard ion gun is depicted schematically in FIG. 3. A neutralizer plate 10 according to FIG. 1 is placed over an ion exit aperture 12 of a well known ion gun 14 in the path of an ion gun output beam 16 and held at ground potential to serve as the neutralizing metal surface. The neutralizer plate 10 as shown in FIG. 1, is 0.50 cm thick with five 0.10 cm cavities passing through it across the diameter of the ion exit aperture 12 with a total of 19 cavities in the area of the aperture 12. The plate 10 may have as little as one cavity or as many cavities as technically practical to fabricate ranging in size from approximately 0.10 inch down to as small as technically possible to fabricate, and the thickness may range from as thick as practical down to as thin a possible to fabricate, but preferrably in the range of 0.5 cm down to 0.015 inch. The neutralizer plate 10 is fabricated from any machinable metal, metal oxide, or metal alloy, but preferrably selected from the group of Mn, Al, $AlO_2$, Be, and BeO.

An electrostatic repeller grid 18 according to FIG. 1 is mounted in the path of a neutral particle beam 20 over the plate 10 and parallel to it by an insulator 22 that is disposed between the repeller grid 18 and the plate 10. The insulator 22 provides a separation of 0.5 inch between the repeller grid 18 and the plate 10, although this separation is not critical. A voltage equal to or greater than the potential for the ion gun 14 is applied to the repeller grid 18 to repel any ion component in the neutral particle beam 20 exiting from the plate 10. The repeller grid 18 is a molybdenum wire grid having a grid wire spacing of 100 wires per inch as shown in FIG. 1 and mounted on a stainless steel ring. The repeller grid 18 may be fabricated from any other metals and may have grid wire spacings of any range adequate to affect electrostatic deflection of any ion component in the neutral particle beam 20. In the alternative, the repeller grid 18 may be an electrostatic grid or plate positioned parallel to and in the proximity of neutral particle beam 20.

Figure 3:
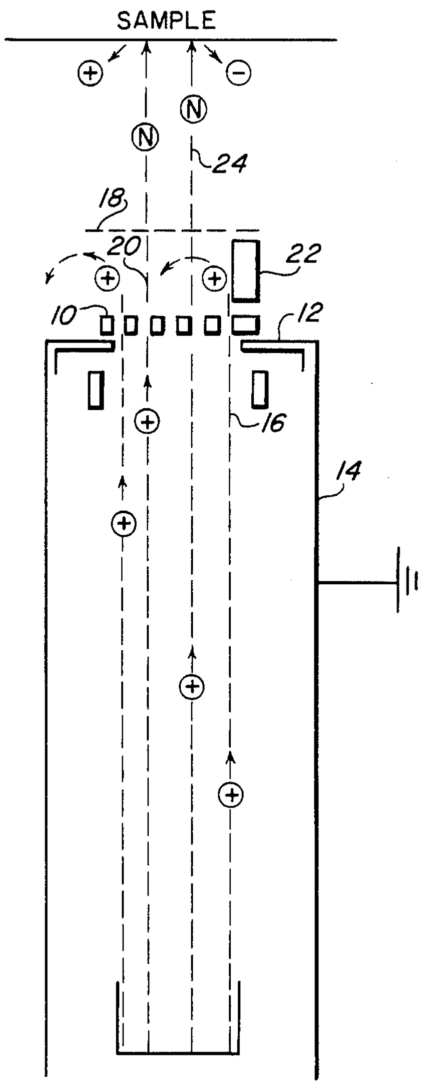
FIG. 3 is a schematic diagram of an ion beam neutralizer according to the present invention mounted on a standard ion gun.

Referring to FIG. 3, the method of generating a neutral particle beam source for both dynamic (intense particle flux) FABMS and static (low particle flux) molecular SIMS is as follows: The neutralizer plate 10, kept at ground potential, converts the ion beam 16 emanating from the ion exit aperture 12 of the ion gun 14 into the neutral particle 20. The repeller grid 18, having a potential equal to or greater than the ion gun 14, is mounted over the ion exit aperture 12 by the insulator 22 to remove any ion component in to the neutral particle beam 20 by repelling the remaining ions in the beam 20 back toward the plate 10, producing a purified neutral particle output beam 24.

Because the pure neutral output beam 24 has a flux proportional to the flux of the ion beam 16, and the ion gun 14 can be adjusted to change the ion beam 16 from dynamic (high particle flux) to static (low particle flux) conditions, the pure neutral output beam 24 may have either dynamic or static characteristics.

The ion-to-neutral ratio using three neutralizing metals, aluminum, gold and molybdenum, with 5 KeV argon primary ions is illustrated in Table 1 set forth below. Measurements are also indicated with only the repeller grid 18 and no neutralizer plate 10 to determine the importance of residual charge-exchange reactions. The relative ion-to-neutral ratios shown are determined by measuring the secondary-ion abundance ratios $I_i/I_V$ and $I_i/I_T$, where $I_i$, $I_V$ and $I_T$ are $Ag^{107}$ positive-ion abundance with repeller grid 18 grounded, at ion gun 14 potential, and 200 volts above ion gun 14 potential respectively.

Figure 4:
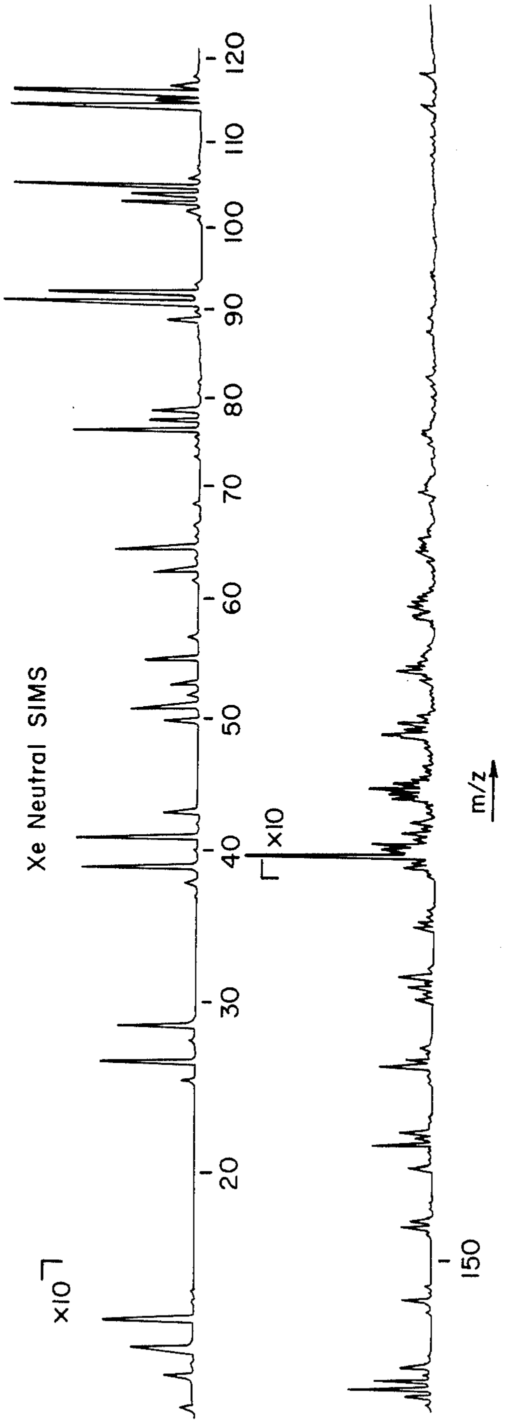
FIG. 4 shows a molecular SIMS spectrum of a 0.5 mm thick film of polystyrene cast on silver, according to the present invention.

A molecular FABMS analysis of a 0.5 mm thick film cast on a silver substrate according to the present invention is shown in FIG. 4. Conventional molecular SIMS analysis of such a material gives no mass spectrum because of sample charging problems. With the present invention, species characteristic of polystyrene are illustrated, such as the protonated styrene ion, the benzyl or tropylium ion and various phenyl ions.

It will be understood that various changes in the details, materials and arrangements of parts that have been herein described and illustrated in order to explain the nature of the invention may be made by those skilled in the art within the principle and scope of the invention as expressed in the appended claims.

What is claimed and desired to be secured by Letters Patent of the United States is:

1. In an ion-to-neutral particle beam generator, a method of converting an energetic ion beam to an energetic neutral particle beam comprising:

directing a beam of ions toward a metal surface;

neutralizing said ions with said metal surface to produce a beam of neutralized particles; and repelling any remaining ions out of said beam of neutral particles;

wherein said step of repelling said ions comprises passing said beam through an electrostatic repeller grid.

2. The neutral particle beam conversion process according to claim 1, wherein said step of directing a beam of ions includes directing a beam of ions from an ion gun having an ion source held at a voltage potential.

3. The neutral particle beam conversion process according to claim 2, wherein said step of bombarding said metal surface includes bombarding said metal surface made from a metal selected from the group consisting of Mn, Al, $AlO_2$, Be and BeO.

4. The neutral particle beam conversion process according to claim 3, wherein said step of neutralizing said ions includes neutralizing said ions with metal surfaces of cavities passing through a metal plate parallel to said beam of ions.

5. The neutral particle beam conversion process according to claim 4, wherein said step of repelling said ions includes repelling said ions with an electrostatic field.

6. The neutral particle beam conversion process according to claim 5, wherein said step of repelling said ions includes the step of repelling said ions in said neutral particle beam with an electrostatic field.

7. The neutral particle beam conversion process according to claim 6, wherein said step of repelling said ions with an electrostatic field includes repelling said ions with said electrostatic repeller grid by establishing a potential on said repeller grid.

8. The neutral particle beam conversion process according to claim 7, wherein said step of neutralizing said ions with said metal surface includes neutralizing said ions with a metal surface having a ground potential.

9. In an ion-to-neutral particle beam generator, a method of converting an ion beam to a neutral particle beam comprising:

directing a beam of ions from an ion gun toward a metal plate held at ground potential, said metal plate comprising a material selected from the group consisting of Mn, Al, $AlO_2$, Be, and BeO;

neutralizing said ions with metal surfaces of cavities passing through said metal plate parallel to said beam of ions to produce beam neutralized particles; and repelling said ions away from said beam of neutral particles by passing said beam of neutral particles through an electric field established by a potential on an electrostatic repeller grid.

10. In an ion-to-neutral particle beam generator, an ion beam neutralizer comprising:

structural means for mounting said ion beam neutralizer on an ion gun exit aperture;

apertural means disposed within said structural means, for passing a beam of ions from said ion gun through said structural means;

neutralization means within said apertural means, for converting said beam of ions into a beam of neutral particles; and repulsion grid means positioned in said beam for deflecting said ions away from said beam of neutral particles.

11. The ion beam neutralizer according to claim 10, wherein said structural means comprises a metal plate mounted on said ion gun exit aperture.

12. The ion beam neutralizer according to claim 11, wherein said apertural means disposed in said structural means comprises a plurality of cavities passing through said metal plate positioned over said ion gun exit aperture.

13. The ion beam neutralizer according to claim 12, wherein said neutralization means comprises metal surfaces of said cavities in said metal plate.

14. The ion beam neutralizer according to claim 13, wherein said ion repulsion means comprises an electrostatic repeller grid across said beam of neutral particles.

15. The ion beam neutralizer according to claim 14, wherein said metal plate comprises a material selected from the group consisting of Mn, Al, $AlO_2$, Be, and BeO.

16. The ion beam neutralizer according to claim 15, wherein said electrostatic repeller grid comprises an electrically charged wire mesh grid.

17. The ion beam neutralizer according to claim 16, wherein said metal plate is held at ground potential.

18. The ion beam neutralizer according to claim 17, wherein said electrically charged wire mesh grid is charged to a potential greater than or equal to that of an ion source for said ion gun.

19. In a secondary ion-to-neutral particle beam generator, an ion beam neutralizer comprising:

a metal plate having a thickness in the range of 0.015 inch to 0.5 cm held at ground potential and mounted on an ion gun exit aperture, said metal plate comprising a material selected from the group consisting of Mn, Al, $AlO_2$, Be, and BeO;

a plurality of cavities through said metal plate positioned over said ion gun aperture;

a wire mesh repeller grid mounted parallel to said metal plate over said cavities and charged to a potential greater than or equal to that of an ion source for said ion gun.

* * * * *